L. E. FOWLER.
GEAR SHIFTING MEANS FOR MOTOR DRIVEN VEHICLES.
APPLICATION FILED FEB. 23, 1918.

1,304,955.

Patented May 27, 1919.

Inventor
L. E. Fowler

By John N. Boss
Cris Attorney

UNITED STATES PATENT OFFICE.

LEONARD E. FOWLER, OF LOUDONVILLE, OHIO.

GEAR-SHIFTING MEANS FOR MOTOR-DRIVEN VEHICLES.

1,304,955.   Specification of Letters Patent.   Patented May 27, 1919.

Application filed February 23, 1918. Serial No. 218,652.

*To all whom it may concern:*

Be it known that I, LEONARD E. FOWLER, a citizen of the United States of America, residing in Loudonville, in the county of Ashland and State of Ohio, have invented certain new and useful Improvements in Gear-Shifting Means for Motor-Driven Vehicles, of which the following is a specification.

This invention relates to an improvement in gear-shifting means for motor-driven vehicles, wherein provision is made for the automatic shifting of the gears under a selective control, simultaneously with and directly as a result of the clutch-release action.

In selective gear transmissions, it is of importance that the gear shifting or changing occur the instant after the clutch is released. And where independent operations of the clutch and gear-shaft lever are necessary, as in the present types of such mechanisms, a proper timing of the operations is rarely had, except by the expert. If, however, the gear shifting be automatically performed in and by the release action of the clutch, the proper relation of the operations is provided for, even in the hands of the novice.

The present invention is therefore designed to provide a means whereby the gear changes may be selected, with such selections storing energy for the actual gear shifting arrangement. This energy is however held from service as a gear shifting means, until the clutch is thrown out, at which time, simultaneously and directly by the clutch movement, the energy is released to perform the actual gear shifting. The direction and degree of action of the stored energy, is governed by the selective means.

The invention is illustrated in the accompanying drawing, as applied to a motorcycle selective transmission, and in such application will be described in the following specification.

In the drawings:—

Figure 1:
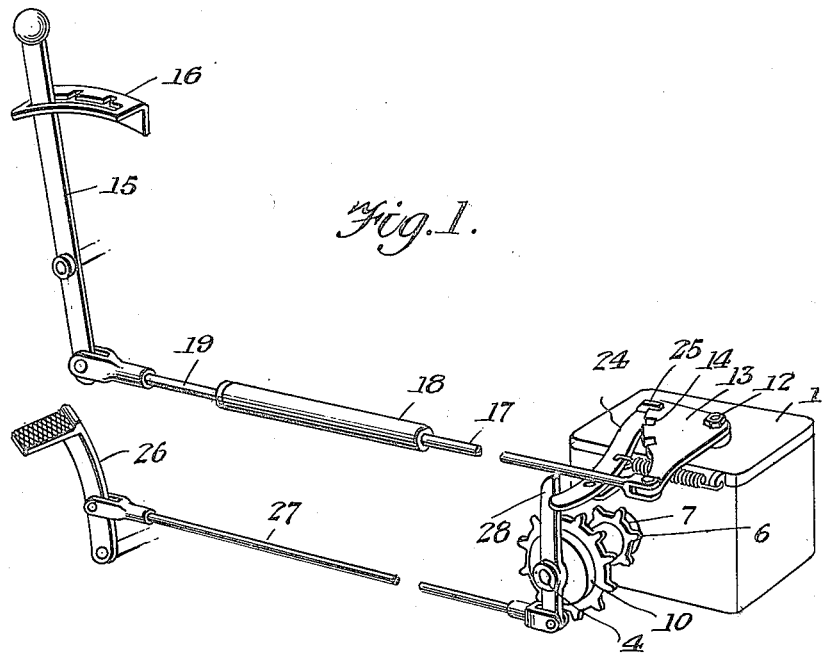
Figure 1 is a perspective view illustrating the application of the invention.
Figure 2:
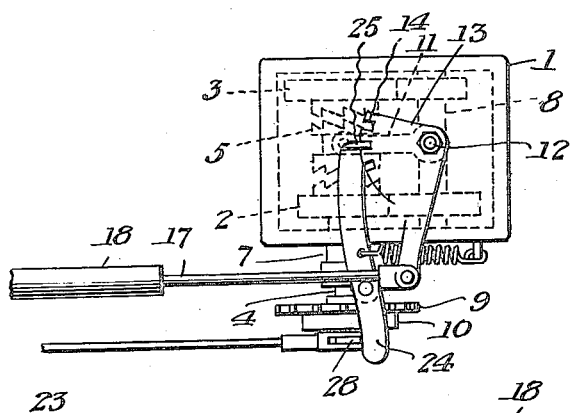
Fig 2 is a plan view, showing the gear-shifting means in dotted lines.
Figure 3:
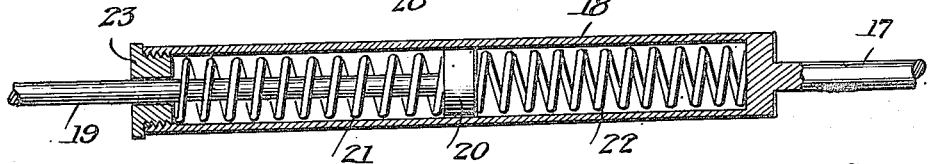
Fig. 3 is an enlarged longitudinal section of the power means of the device.

The invention is here shown as applied to a selective gear transmission of a motor cycle, wherein the gear box 1 contains the drive gears 2 and 3, loosely mounted on the drive shaft 4, with either adapted to be selectively connected to the shaft, through a double clutch 5, and clutch faces on the gears, all as is usual in this type. The drive shaft, when acting through one gear directly, as 2 drives the rear wheel through a sprocket 6, secured on a sleeve 7, forming part of such gear 2; while gear 3, when clutched to the drive shaft, operates through a jack shaft 8, also mounted in the gear box, and having fixed gears of the desired size, in permanent mesh with the gears 2 and 3.

The outer end of the drive shaft is provided with the usual engine driven sprocket 9, having a clutch connection 10 with such shaft, this clutch 10 therefore controlling the entire driving action of the transmission gears and constituting the main clutch.

The present improvement is directly concerned with the shifting of the clutch 5, which is the clutch controlling the gear changes. As the shifting of the clutch 5 is best performed, for reasons above noted, the instant after the clutch 10 is released, the invention provides a means for automatically shifting the clutch 5 at this time, and in accordance with the previous selection of gear change.

The actual shifting of the clutch 5 is performed through a yoke 11, arranged within the gear box and engaging the clutch. The yoke is secured on a rod 12, extending through one wall of the gear box, and having a segment 13 secured on the outer end thereof. The operative edge of the segment 13 is preferably curved concentric with the rod, and is formed with the notches 14, corresponding in number with the number of positions of the clutch, here shown as a neutral position, a low gear position, and a high gear position.

The selective feature of the gear shift is of the usual type, including a pivotally mounted lever 15, mounted for operative movement, and adapted to be selectively interlocked with a particular notch in the usual slot-member 16, in accordance with the gear shift selected.

Preferably intermediate the lever 15 and segment 13, is a power device, constructed so that a shift of the lever will store energy, for a subsequent operation of the segment. This power device, is preferably here shown comprising a sectional rod member, one section 17 of which is secured at one terminal to the segment, and is formed at the opposite terminal as a sleeve extension 18. The other section 19 of the rod is secured at one terminal to the hand lever 15, and formed at the opposite terminal with a head 20 adapted to slidably fit within the sleeve extension 18. Compression springs 21 and 22 are arranged within the sleeve 18, on opposite sides of the head 20, a removable plug 23 closing the open end of the sleeve, except for the rod section.

The springs 21 and 22, which form the connection between the rod-sections 17 and 19, are of equal strength, and if unrestricted, would transmit movement of the lever 15 to the segment 13 which would allow gear shift to be performed in the usual way. However, it is desired that the movement of the lever 15, and the rod section 19 connected thereto, be also prevented from a direct gear shift action, and that such movement be utilized as a power storing action. This result will be secured, as a movement of the lever 15 alone, will compress one or the other of the springs, for high or low gear shift from neutral, or from each other, or to neutral from either speed.

A power operated locking lever 24 is pivotally mounted on the gear box, with one end provided with a projection 25, to enter a properly-alined notch 14 of the segment, and prevent movement of such segment. The opposite end of the locking lever overlies the clutch 10. With the segment thus locked the movement of the shifting lever 15, can only compress one or the other of the springs 21 and 22, and thus store the energy of its movement.

The main clutch 10 is operated through the usual pedal 26 and connecting rod 27. A trip bar 28 is secured on the movable face of the clutch 10, which bar, as the clutch is moved to release position in the action of the pedal 26, will engage the free end of the locking lever 24, and trip the same from locking engagement with the segment, freeing the segment for movement.

The normal position of the locking lever 24, when free to act, is to hold the segment 13, and therefore the gear shifting yoke, from movement under the manual operation of the shifting lever 15, because of the locking mechanism, and hence with the gears in any particular arrangement, the shifting of the lever 15 to change the gear, will only act to store energy in the springs 21 and 22, and without effecting any movement of the segment. When the pedal 26 is operated to release the clutch 10, however, the locking lever is tripped, and the stored energy of the spring acts to move the segment 13, and complete the gear shift. In other words, the gear change, which is entirely within the selection of the driver, is set for operation, but does not function for a complete change until the main clutch is released. The completion of the gear shift is thus automatically carried out by and simultaneously with the clutch release, and all possibility of breakage incident to the gear change is prevented, and the change is made at a time when the least wear of the parts will result.

The opposed springs 21 and 22 will obviously permit the selective gear change, as no matter what the particular position of the segment 13, a movement of the lever 15, will store energy in the particular spring as will move the segment in the direction and to the extent desired.

Having thus described the invention, what is claimed is:—

1. A clutch shifting mechanism, comprising a clutch-shifting element, a lever, a unitary power device for operation of said element which is connected to said lever, means for normally locking the element against the power device, and means for setting the power device for selective movement of the element.

2. A clutch shifting mechanism, a unitary power device for operating the same, a lever for selectively setting the power device connected to said power device, a lock for normally holding the element against the power device, and means for releasing the lock at will.

3. A clutch shifting mechanism, a unitary power device therefor, a lever for setting the power device in accordance with the desired movement of the element which is connected to said lever, a locking bar for normally holding the element against movement, pedal operating means for releasing the locking bar at will.

4. The combination with an engine clutch, of a clutch shifting device including a unitary power device, a lever connected to said power device, means for setting the power device in accordance with the desired clutch change associated with said lever, means for holding the power device inactive, and means actuated in the operation of the engine clutch to release the power device for gear shifting purposes.

5. The combination with an engine clutch, of a clutch shifting device including a unitary power device, a lever connected to said power device, means for setting the power device in accordance with the desired gear change associated with said lever, means for locking the clutch shifting device against shift while the engine clutch is in one position, and means operated in the movement of the clutch to the opposite position for releasing the power device for clutch shifting.

6. The combination with an engine clutch, of a clutch shifting mechanism including a unitary power device selectively set for a predetermined operation, a lever connected to said power device for operating same, means for holding the power device against operation while the clutch is in, and means for releasing the power device for operation when the clutch is moved out.

7. A clutch shifting mechanism, comprising a clutch shifting element, a locking bar therefor, a selective setting lever, a connection between said lever and element comprising relatively movable sections, a spring opposing relative movements of the sections in either direction, and means for operating the locking bar to release the element at will.

8. A clutch shifting mechanism, comprising a clutch-shifting element formed with notches, a locking bar to engage said notches, a selective setting lever, a connection between said element and lever and comprising a rod connected to the element and having a sleeve like end, a second rod connected to the lever and having a head slidably fitting within the sleeve, and a spring arranged within the sleeve on each side of the head.

In testimony whereof I affix my signature.

LEONARD E. FOWLER.